United States Patent
Morishita

(10) Patent No.: US 7,908,585 B2
(45) Date of Patent: Mar. 15, 2011

(54) COMPUTER READABLE RECORDING MEDIUM RECORDED WITH GRAPHICS EDITING PROGRAM, AND GRAPHICS EDITING APPARATUS

(75) Inventor: Ryohei Morishita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1204 days.

(21) Appl. No.: 11/453,225

(22) Filed: Jun. 14, 2006

(65) Prior Publication Data
US 2007/0208441 A1    Sep. 6, 2007

(30) Foreign Application Priority Data
Mar. 2, 2006   (JP) ................................. 2006-055624

(51) Int. Cl.
*G06F 9/44* (2006.01)
(52) U.S. Cl. ......... 717/113; 717/105; 717/109; 715/763
(58) Field of Classification Search .................. 717/105, 717/109, 113; 715/763
See application file for complete search history.

(56) References Cited

U.S. PATENT DOCUMENTS
2002/0120919 A1 * 8/2002 Aizenbud-Reshef et al. 717/127
2002/0154117 A1 * 10/2002 Saitou ............................. 345/440
2004/0073404 A1 * 4/2004 Brooks et al. .................. 702/183

FOREIGN PATENT DOCUMENTS
JP          07-325690         12/1995
* cited by examiner

*Primary Examiner* — Wei Y Zhen
*Assistant Examiner* — Phillip H Nguyen
(74) *Attorney, Agent, or Firm* — Fujitsu Patent Center

(57) ABSTRACT

When an element is interactively arranged in cooperative with an input device and a display device, if the arranged element is overlapped with a line segment which connects the already arranged two elements to each other, the relation is provided among these three elements, to be displayed, so that the arranged element is interrupted in the relation between the already arranged two elements, which is specified by the line segment. Therefore, it becomes possible to interrupt the element in the relation which relates the already arranged two elements to each other. Hence, it is possible to easily provide the relation between elements while reflecting the intention of user as much as possible.

8 Claims, 5 Drawing Sheets

FIG.2

| ELEMENT | RELATION |
|---|---|
| ELEMENT 1 | RELATION 1 |
| ELEMENT 2 | RELATION 1 |

FIG.3

| RELATION | CONNECTION STATE |
|---|---|
| RELATION 1 | ELEMENT 1 - ELEMENT 2 |

FIG.6

| ELEMENT | RELATION |
|---|---|
| ELEMENT 1 | RELATION 2 |
| ELEMENT 2 | RELATION 3 |
| ELEMENT 3 | RELATION 2, RELATION 3 |

FIG.7

| RELATION | CONNECTION STATE |
|---|---|
| RELATION 2 | ELEMENT 1 – ELEMENT 3 |
| RELATION 3 | ELEMENT 3 – ELEMENT 2 |

# COMPUTER READABLE RECORDING MEDIUM RECORDED WITH GRAPHICS EDITING PROGRAM, AND GRAPHICS EDITING APPARATUS

BACKGROUND OF THE INVENTION

1. Field of the Invention

The present invention generally relates to a technology for easily providing the relation between elements while reflecting the intent of user as much as possible, in a graphics editing technology for performing the system development or the like in a visual environment using graphics. More particularly, the present invention relates to a computer readable recording medium with graphics editing program and a graphics editing apparatus.

2. Description of the Related Art

In recent years, a UML (Unified Modeling Language) tool as a graphics editor has been widely used, for performing efficiently the system development or the like in a visual environment. The UML tool provides functions of preparing and editing, as a fundamental design diagram of a system, a use-case diagram, an activity diagram, a state machine diagram, a sequence diagram, a class diagram and the like, in each of which various elements are connected to each other depending on the relation thereof. In an operation of the UML tool, since the relation between elements need to be provided by associating the elements, after the elements are arranged, it is necessary to designate two elements using an input device such as a mouse or the like, to provide the relation between the two elements. Therefore, in order to easily associate the elements with one another, as disclosed in Japanese Unexamined Patent Publication No. 7-325690, there has been proposed a technology for identifying an element which is present within a predetermined distance from a new arranged element, to automatically provide the relation between these elements by association.

However, in the conventionally proposed technology, the relation between the elements is provided by associating the elements with one another, based on the distance relation between these elements. Therefore, it is not easy to arrange, in brief, cut in another element between already arranged two elements which are associated with each other. Namely, if an element is arranged between two elements, these three elements are connected to each other in a ring shape or a tree shape according to an arrangement position of the arranged element. Therefore, after one of the already arranged two elements is edited out, new two elements need to be arranged sequentially, resulting in much effort for graphics edition.

The present invention has been accomplished with a view to eliminating the above problem in the conventional technology and has an object to provide a graphics editing technology capable of easily providing the relation between elements by association while reflecting the intent of user as much as possible, in which, when an element is arranged so as to be overlapped with a line segment which connects the already arranged two elements to each other, the association is made among these three elements so that the arranged element is cut in the relation between the already arranged two elements, which is specified by the line segment.

SUMMARY OF THE INVENTION

In order to achieve the above object, in a graphics editing technology according to the present invention, when an element is interactively arranged, if the arranged element is overlapped with a line segment which provides connection between the already arranged two elements, the relation is provided among these three elements by association so that the arranged element is interrupted in the relation between the already arranged two elements, which is specified by the line segment. The term "arrangement" herein means the concept containing the arrangement in which the already arranged element is moved to be re-arranged, in addition to the arrangement of a new element.

Accordingly, if the element is interactively arranged so as to be overlapped with the line segment which connects the already arranged two elements to each other, these three elements are associated with each other so that the arranged element is interrupted in the relation between the already arranged two elements, which is specified by the line segment. Therefore, it becomes possible to interrupt the arranged element in the relation which associates the already arranged two elements with each other, with a simple operation. Thereby, it becomes easy to provide the relation between elements by association while reflecting the intention of user as much as possible.

At this time, when the arranged element is overlapped with a plurality of line segments, it may be determined that the arranged element is overlapped with the line segment of a shortest distance from the graphic centroid or with the line segment whose arrangement time is latest, among the plurality of line segments. Alternatively, by displaying a selection screen for making a user to select one from the plurality of line segments, it may be determined that the arranged element is overlapped with the line segment selected by the user.

The other objects, features and advantages of the present invention will be made apparent from the following description of the embodiment with reference to the accompanying drawings.

BRIEF DESCRIPTION OF THE DRAWINGS

FIG. 2 is an explanatory diagram of an element relation table;

FIG. 3 is an explanatory diagram of a relation connection table;

FIG. 6 is an explanatory diagram of the element relation table which is updated with the element arrangement; and FIG. 7 is an explanatory diagram of the relation connection table which is updated with the element arrangement.

DESCRIPTION OF THE PREFERRED EMBODIMENT

Hereinafter, the present invention will be described with reference to drawings.

Figure 1:
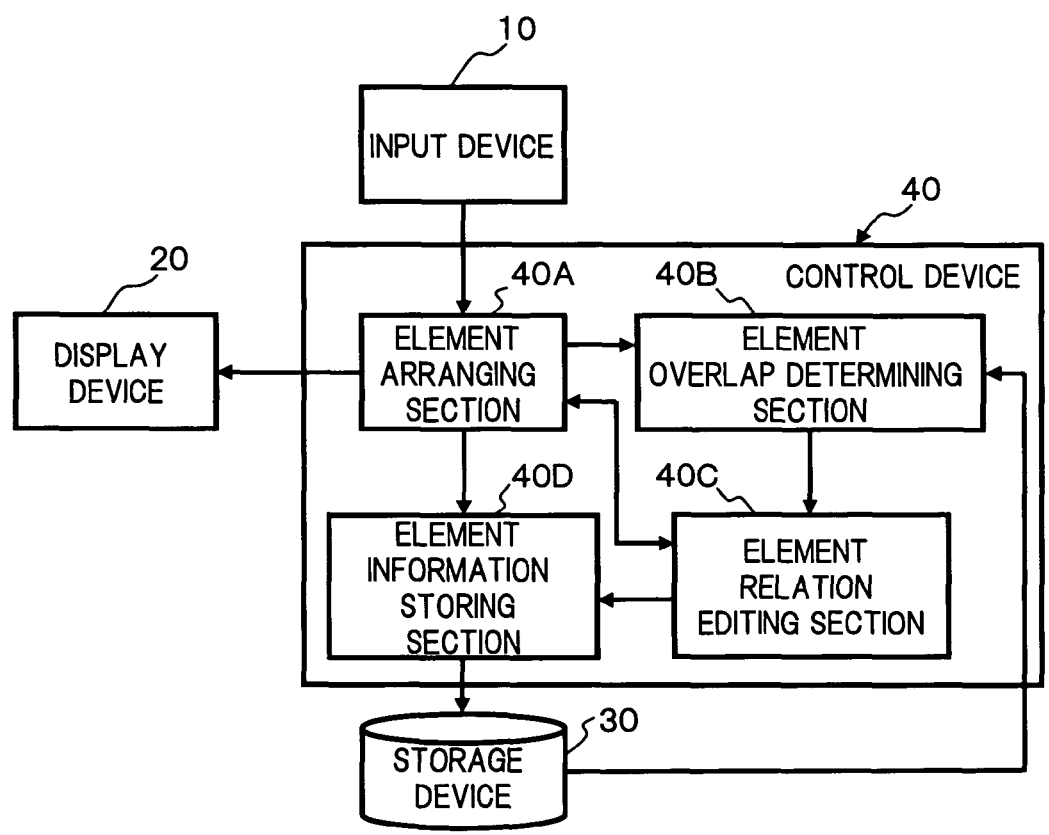
FIG. 1 is an entire block diagram of a graphics editing apparatus which realizes the present invention.

FIG. 1 shows an entire configuration of a graphics editing apparatus which realizes a graphics editing technology according to the present invention.

The graphics editing apparatus is constructed by installing a graphics editing program recorded in a computer readable recording medium, such as a CD-ROM, a DVD-ROM or the like, in an all-purpose computer such as a PC (Personal Computer). More specifically, the graphics editing apparatus includes: an input device 10 provided with a pointing device, such as a mouse, and a keyboard; a display device 20 comprised of a CRT (Cathode Ray Tube) or a LCD (Liquid Crystal Display) or the like; a storage device 30 comprised of a hard disk or the like; and a control device 40 provided with a memory and a CPU (Central Processing Unit).

In the storage device 30, as information of elements constituting a fundamental design diagram of a system or the like, in addition to the properties describing types of the elements and arrangement positions thereof or the like, there are registered an element relation table as shown in FIG. 2 and a relation connection table as shown in FIG. 3 respectively. The element relation table describes the relation of each element in association with the respective elements. Further, the relation connection table describes connection states between the elements in association with each relation. Moreover, in the storage device 30, there is also registered the properties of the relation which relates two elements to each other, namely, the properties of a line segment which connects the two elements to each other.

On the other hand, in the control device 40, the graphics editing program is executed, so that an element arranging section 40A, an element overlap determining section 40B, an element relation editing section 40C and an element information storing section 40D are realized, respectively. The element arranging section 40A provides a function of cooperating with the input device 10 and the display device 20, to interactively arrange elements. The element overlap determining section 40B provides a function of, when an element is arranged by the element arranging section 40A, referring to the properties of the elements and the properties of the relation, which are registered in the storage device 30, to determine whether or not the arranged element is overlapped with a line segment which connects already arranged two elements. The element relation editing section 40C provides a function of, when it is determined by the element overlap determining section 40B that the arranged element is overlapped with the line segment, relating these three elements to each other so that the element arranged by the element arranging section 40A is cut in the relation between the already arranged two elements, which is specified by the line segment. The element information storing section 40D provides a function of, when the element is arranged by the element arranging section 40A, registering the properties of the arranged element in the storage device 30, and also, when the three elements are related to each other by the element relation editing section 40C, updating the properties of the relation, the element relation table and the relation connection table, respectively, which are registered in the storage device 30. Further, the element arranging section 40A also provides a function of, when the three elements are related to each other by the element relation editing section 40C, displaying this relation on the display device 20.

Here, an element arranging step, element arranging means, a relation display step and relation display means are realized respectively by the element arranging section 40A, and also, an overlap determining step and overlap determining means are realized respectively by the element overlap determining section 40B. Further, an associating step and associating means are realized respectively by the element relation editing section 40C.

Figure 4:
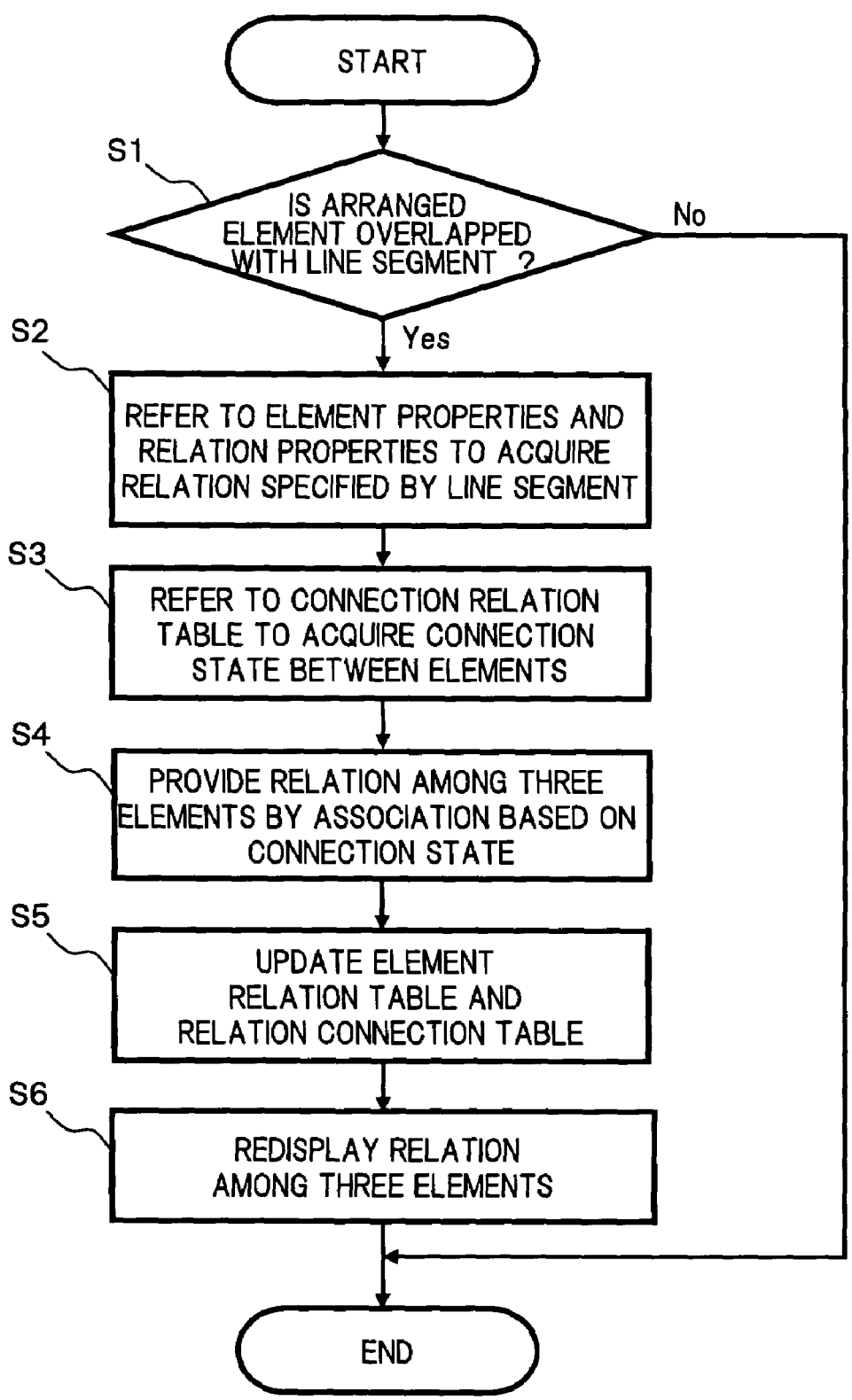
FIG. 4 is a flowchart showing the processing content of a graphics editing program.

FIG. 4 shows the processing content of the graphics editing program which is executed in the control device 40 at a momentum of when an element is interactively arranged. The term "arrangement" herein means the concept containing the arrangement in which the already arranged element is moved to be re-arranged, in addition to the arrangement of a new element.

In step 1 (to be abbreviated as S1 in the drawing figure, and the same rule will be applied hereunder), the properties of the relation registered in the storage device 30 is referred to, thereby determining whether or not the element arranged (to be referred to as the arranged element) is overlapped with the line segment which connects the already arranged two elements to each other. Then, if the arranged element is overlapped with the line segment, the routine proceeds to step 2 (Yes), while if the arranged element is not overlapped with the line segment, the processing is terminated (No).

In step 2, the properties of the elements and the properties of the relation, which are registered in the storage device 30, are respectively referred to, thereby acquiring the relation specified by the line segment with which the arranged element is overlapped.

In step 3, the connection relation table registered in the storage device 30 is referred to, thereby acquiring a connection state between the already arranged two elements which are related to each other by the relation acquired in step 2.

In step 4, based on the connection state between the already arranged two elements acquired in step 3, the three elements are related to each other so that the arranged element is interrupted in the relation of the already arranged two elements.

In step 5, the element relation table and the relation connection table, which are registered in the storage device 30, are updated respectively. Namely, the relation among the three elements which are related to each other in step 4, is additionally registered in the element relation table and in the relation connection table, and also, the relation specified by the line segment with which the arranged element is overlapped is edited out.

In step 6, the relation among the three elements is redisplayed on the display device 20.

According to such a graphics editing apparatus, when an element is interactively arranged in cooperative with the input device 10 and the display device 20, if the arranged element is arranged so as to be overlapped with the line segment which connects the already arranged two elements to each other, the three elements are related to each other so that the arranged element is interrupted in the relation between the already arranged two elements, which is specified by the line segment. Then, the relation among the three elements is redisplayed on the display device 20.

Figure 5:
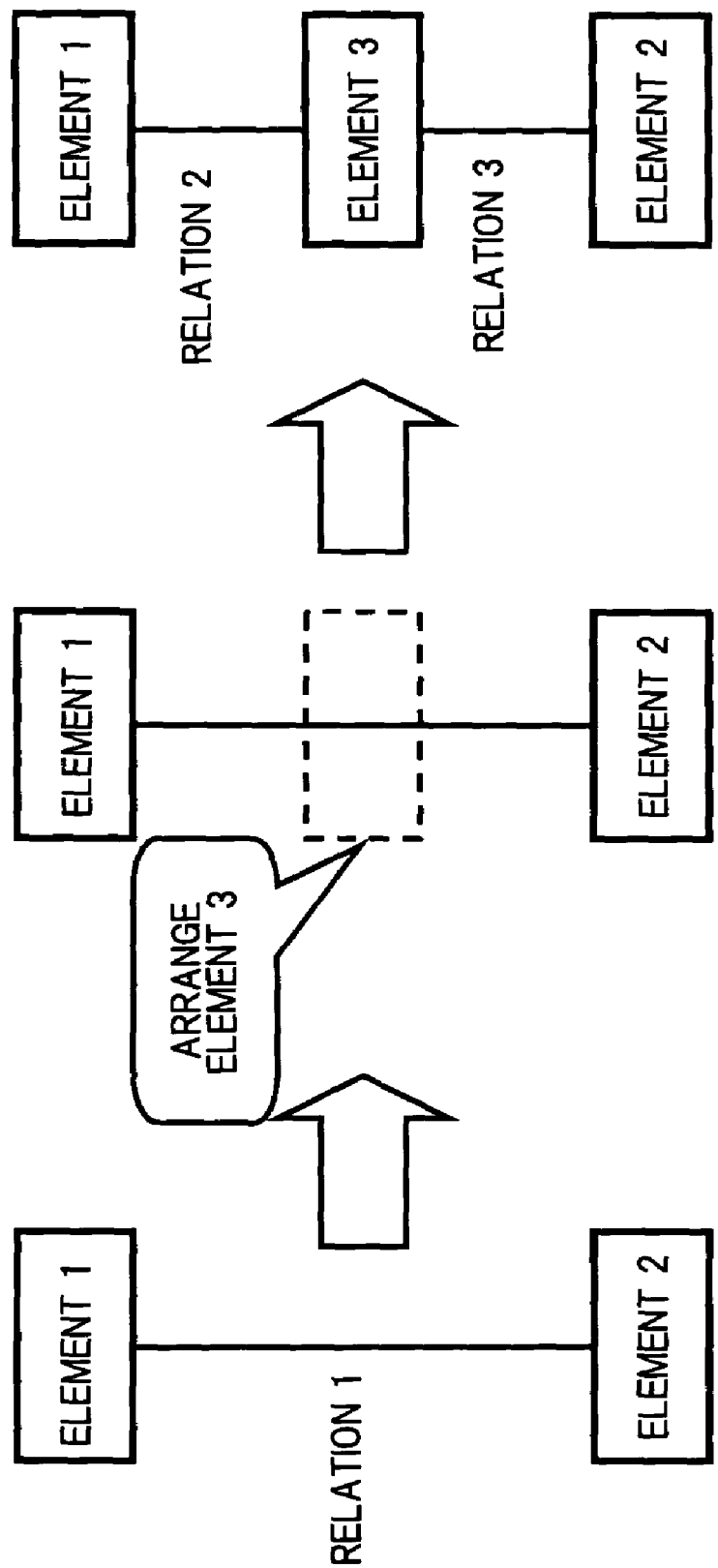
FIG. 5 is an explanatory diagram of a functional overview of the graphics editing apparatus.

Here, in order to easily understand the processing of providing the relation among the three elements by the graphics editing apparatus, as shown in FIG. 5, the description is made in time-series on the processing for when an element 3 is arranged so as to be overlapped with a line segment which connects an element 1 and an element 2 to each other.

When the element 3 is arranged, the properties of the elements and the properties of the relation are referred to, thereby acquiring the relation 1 specified by the line segment with which the element 3 is overlapped. When the relation 1 is acquired, the relation connection table shown in FIG. 3 is referred to, thereby acquiring the connection state between the elements by the relation 1, namely, that the element 1 and the element 2 are associated with each other by the relation 1. Then, the three elements are associated with each other so that the element 3 is interrupted in the element 1 and the element 2, and as shown in FIG. 6 and FIG. 7, the element relation table and the relation connection table are updated respectively. Thereafter, as shown in FIG. 5, the relation among the three elements is redisplayed on the display device 20.

Therefore, it becomes possible to interrupt the arranged element in the relation which associates the already arranged two elements with each other with a simple operation, thereby easily providing the relation between elements while reflecting the intent of user as much as possible.

Here, it is desirable that there is provided an arrangement fixing function of fixing the element arrangement by the element arranging section 40A, so that, when the element arrangement is fixing by the arrangement fixing function, the element overlap determining section 40B determines whether or not the arranged element is overlapped with line segment. As the arrangement fixing function, the right-click of the mouse, the selection from menus or the like can be applied. In such a manner, even in the case where the already arranged element is erroneously overlapped with another line segment when the already arranged element is moved, if the fixing of this movement is not performed, this element is not interrupted in the relation between two elements, which is specified by such another line segment. Therefore, it is possible to interrupt an element in only an actually desired portion. Incidentally, an arrangement fixing step is realized by the arrangement fixing function.

When it is determined by the element overlap determining section 40B that the arranged element is overlapped with a plurality of line segments, it may be determined that the arranged element is overlapped with the line segment of a shortest distance from the graphic centroid or with the line segment whose arrangement time is latest, among the plurality of line segments. Alternatively, by displaying a selection screen for making a user to select one from the plurality of line segments, it may be determined that the arranged element is overlapped with the line segment selected by the user. In such a manner, even if a plurality of line segments each of which connects two elements to each another, is close to each other, it is possible to designate a desired one from the plurality of line segments.

Moreover, the present invention is not limited to a "UML tool", and is applicable to the software for preparing a flowchart or a CAD.

What is claimed is:

1. A computer readable recording medium recorded with a graphics editing program for realizing, in a computer, a method comprising:
   arranging elements interactively in cooperative with an input device and a display device;
   determining, when an element is arranged by said arranging, whether or not the arranged element is overlapped with a line segment which connects the already arranged two elements to each other;
   associating, when it is determined by said determining that the arranged element is overlapped with the line segment, these three elements with one another to provide a relation thereamong so that the arranged element is interrupted in the relation between the already arranged two elements, which is specified by said line segment; and
   displaying, on said display device, the relation among the three elements which are associated with one another by said associating,
   wherein said determining determines, when the element arranged by said arranging is overlapped with a plurality of line segments, that said arranged element is overlapped with the line segment of a shortest distance from a graphic centroid, among the plurality of line segments.

2. A computer readable recording medium recorded with a graphics editing program for realizing, in a computer, a method comprising:
   arranging elements interactively in cooperative with an input device and a display device;
   determining, when an element is arranged by said arranging, whether or not the arranged element is overlapped with a line segment which connects the already arranged two elements to each other;
   associating, when it is determined by said determining that the arranged element is overlapped with the line segment, these three elements with one another to provide a relation thereamong so that the arranged element is interrupted in the relation between the already arranged two elements, which is specified by said line segment; and
   displaying, on said display device, the relation among the three elements which are associated with one another by said associating,
   wherein said determining determines, when the element arranged by said arranging is overlapped with a plurality of line segments, that said arranged element is overlapped with the line segment whose arrangement time is latest, among the plurality of line segments.

3. A computer readable recording medium recorded with a graphics editing program according to claim 1,
   wherein said determining allows, when the element arranged by said arranging is overlapped with a plurality of line segments, said display device to display a selection screen for urging a user to select one from the plurality of line segments, to determine that said arranged element is overlapped with the line segment selected by the user.

4. A computer readable recording medium recorded with a graphics editing program according to claim 1,
   wherein said program further comprises fixing the element arrangement by said arranging; and
   said determining determines, when the element arrangement is fixing by said fixing, whether or not the arranged element is overlapped with the line segment which connects the already arranged two elements to each other.

5. A graphics editing apparatus comprising:
   a processor to execute a procedure, the procedure comprising:
   interactively arranging elements;
   determining, when an element is arranged by the arranging, whether or not the arranged element is overlapped with a line segment which connects the already arranged two elements to each other;
   associating, when it is determined by the determining that the arranged element is overlapped with the line segment, these three elements, so that the arranged element is interrupted in the relation between the already arranged two elements, which is specified by said line segment; and
   displaying the relation among the three elements which are associated with one another by the associating,
   wherein said determining determines, when the element arranged by the arranging is overlapped with a plurality of line segments, that said arranged element is overlapped with the line segment of a shortest distance from a graphic centroid, among the plurality of line segment.

6. A graphics editing apparatus comprising:
   a processor to execute a procedure, the procedure comprising:
   interactively arranging elements;
   determining, when an element is arranged by the arranging, whether or not the arranged element is overlapped with a line segment which connects the already arranged two elements to each other;

associating, when it is determined by the determining that the arranged element is overlapped with the line segment, these three elements, so that the arranged element is interrupted in the relation between the already arranged two elements, which is specified by said line segment; and displaying the relation among the three elements which are associated with one another by the associating, wherein the determining determines, when the element arranged by the arranging is overlapped with a plurality of line segments, that said arranged element is overlapped with the line segment whose arrangement time is latest, among the plurality of line segments.

7. A computer readable recording medium recorded with a graphics editing program according to claim 2, wherein said determining allows, when the element arranged by said arranging is overlapped with a plurality of line segments, said display device to display a selection screen for urging a user to select one from the plurality of line segments, to determine that said arranged element is overlapped with the line segment selected by the user.

8. A computer readable recording medium recorded with a graphics editing program according to claim 2, wherein said program further comprises fixing the element arrangement by said arranging; and said determining determines, when the element arrangement is fixing by said fixing, whether or not the arranged element is overlapped with the line segment which connects the already arranged two elements to each other.

* * * * *